SCANNING APPARATUS

Filed March 28, 1960 3 Sheets-Sheet 1

INVENTOR:
William L. Mohan Jr.,
BY
Louis Bernat
ATTORNEY.

INVENTOR:
William L. Mohan Jr.
BY
Louis Bernat
ATTORNEY.

April 2, 1963 W. L. MOHAN, JR 3,084,301

SCANNING APPARATUS

Filed March 28, 1960 3 Sheets-Sheet 3

INVENTOR:
William L. Mohan Jr.,
BY
Louis Bernat
ATTORNEY.

United States Patent Office 3,084,301

Patented Apr. 2, 1963

3,084,301

SCANNING APPARATUS

William L. Mohan, Jr., Mount Prospect, Ill.
(203 Chester Lane, Prospect Heights, Ill.)

Filed Mar. 28, 1960, Ser. No. 17,829
14 Claims. (Cl. 338—18)

My invention relates generally to scanning apparatus and more particularly to a new and improved method and means for sensing radiation which finds advantageous use in scanner apparatus.

In one of its specific aspects, the present invention is related to the type of scanner disclosed in the U.S. patent of Hancock et al., Patent No. 2,413,349. In scanners of the type disclosed therein, there is a need to reject the effect of changes in the general level of incident illumination. Unless such effects are rejected properly, the scanner would or could be made to produce fictitious signals in response to the ambience of normal illumination.

Conventional radiation sensors, such as photocells and the like, are incapable of rejecting the effect of ambient light. Therefore, prior to my invention, scanners made use of a pair of photo-electric cells connected in a push-pull circuit and arranged to receive radiations in alternate fashion through individual optical gratings to cancel the effect of varying ambient levels.

This necessary duplication of photo-electric cells which is characteristic of the prior art systems has required a concomitant duplication of enclosures, optical gratings, and imaging lenses. This extensive duplication, in turn, necessitates precise alignment of the separate assemblies to enable the effects of varying ambient levels to be cancelled. Obviously, this duplication of scanner elements results in a unit which is bulkier and heavier than would be required if it were possible to eliminate this duplication. Reductions of both weight and size are particularly desirable in modern aerial reconnaissance vehicles employing scanners since space and weight are usually at a premium in such vehicles.

Therefore, a general object of my invention is to provide an improved radiation sensor, which when embodied in the form of a photo-electric cell for scanners, overcomes the limitations of the prior art by its inherent ability to reject the effects of incident ambient light.

Another object of my invention is the provision of a novel photo-electric cell for scanners which requires a minimum of complementary equipment, and therefore permits economical construction of a more simple and compact scanner than heretofore possible.

Yet another object of my invention is the provision of a radiation sensor which is characterized by its ability to develop an alternating signal proportional to the velocity of an image transversing its face. Still further objects and features of my invention pertain to the particular structures, arrangements and methods of manufacture whereby the above objects are attained.

A preferred embodiment of the radiation sensor in accordance with the principles of the invention comprises an insulating backing plate on which radiation sensitive material is deposited. Either before or after this deposition, suitable electrical conductors are applied to the backing plate in a position to make electrical contact with the radiation sensitive material to thereby provide suitable collector paths.

The invention, both to its structure, mode of operation, and method of manufacture, will be better understood by reference to the following disclosure and drawings forming a part thereof wherein.

Figures 1, 2, 3:
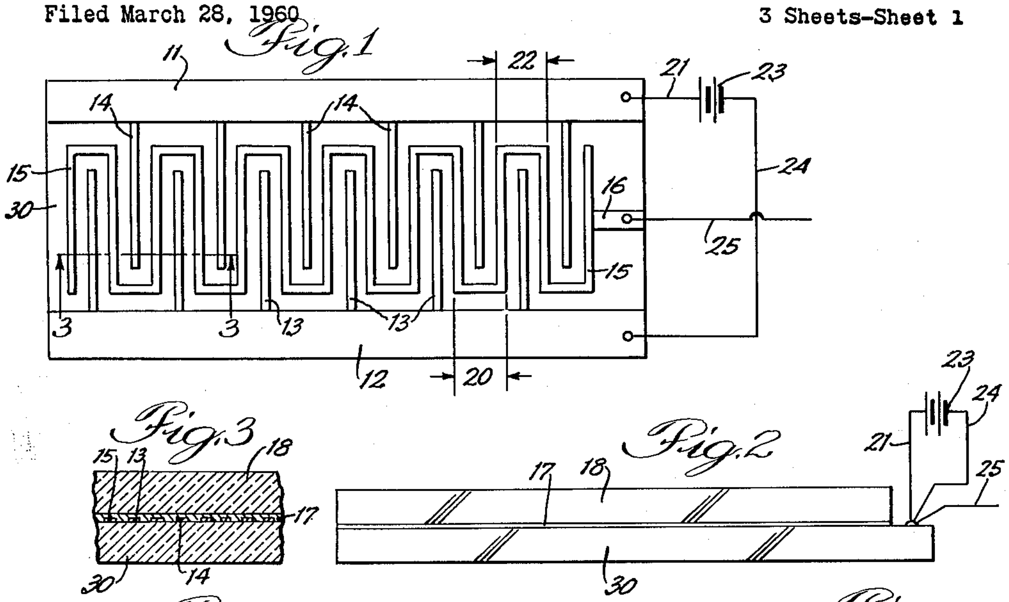
FIGURE 1 is a plan view of a radiation sensor embodying the principles of the invention.
FIGURE 2 is a top side view of the embodiment of FIGURE 1 and further having a cover associated therewith.
FIGURE 3 is a section taken along the lines 3—3 of FIGURE 1 and including a cover associated therewith.
Figures 6, 7, 8, 9, 14A, 14B:
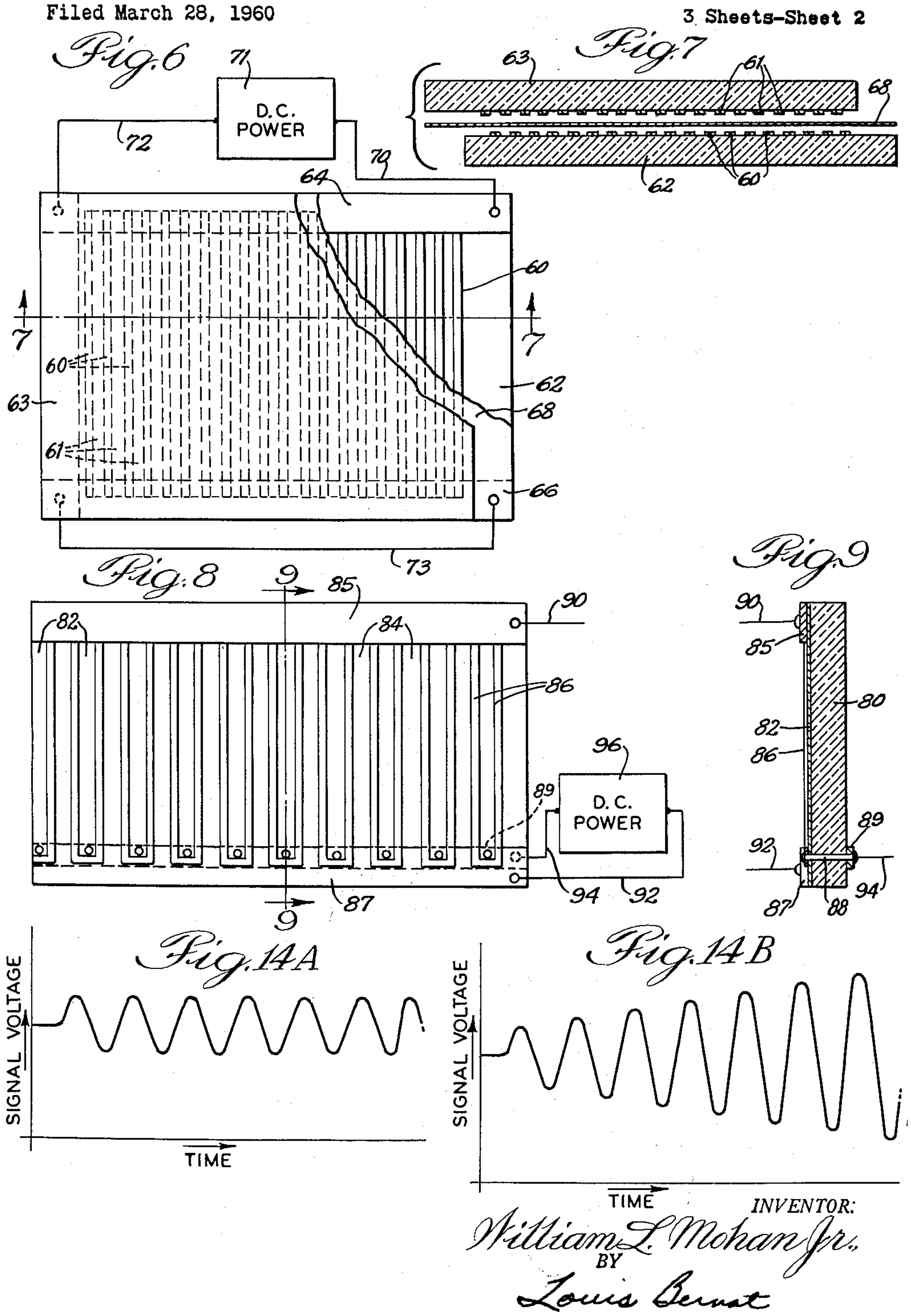
FIGURES 6 and 7 illustrate still another embodiment of the invention with FIGURE 6 being partially broken away, and FIGURE 7 being taken substantially as shown along lines 7—7 of FIGURE 6.
FIGURES 8 and 9 illustrate yet another embodiment of the invention with FIGURE 9 being taken substantially as shown along 9—9 of FIGURE 8.
Figures 10, 11, 12:
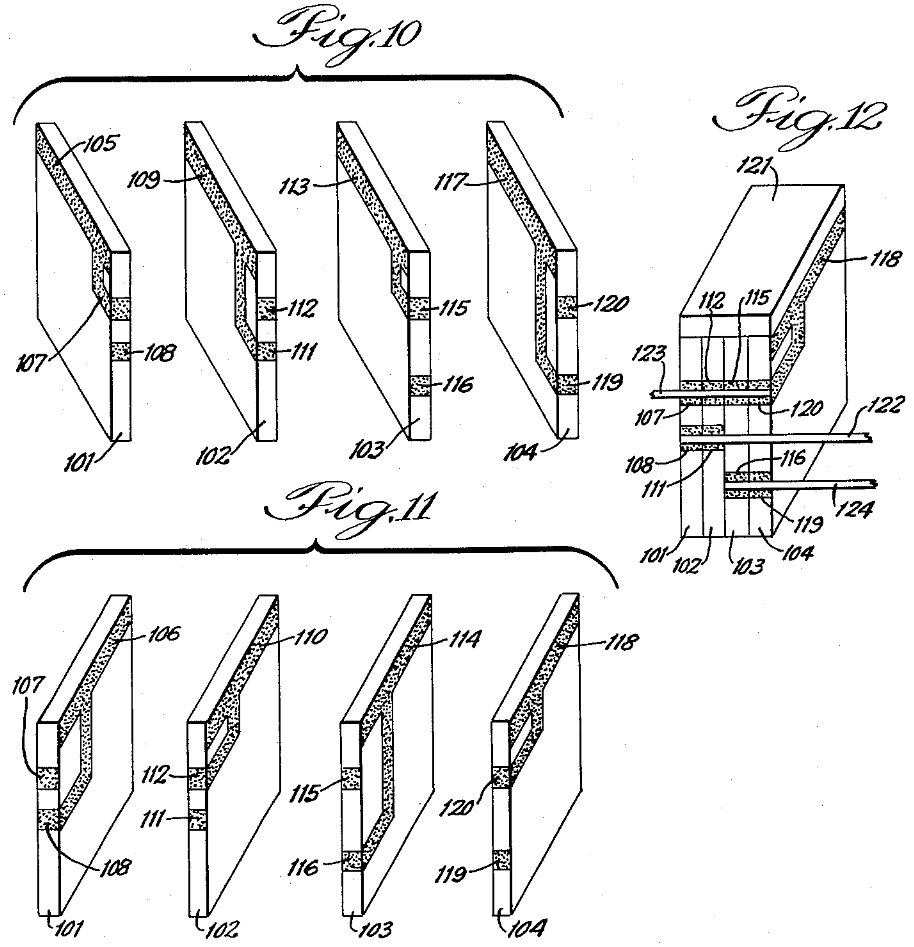
Figure 13:
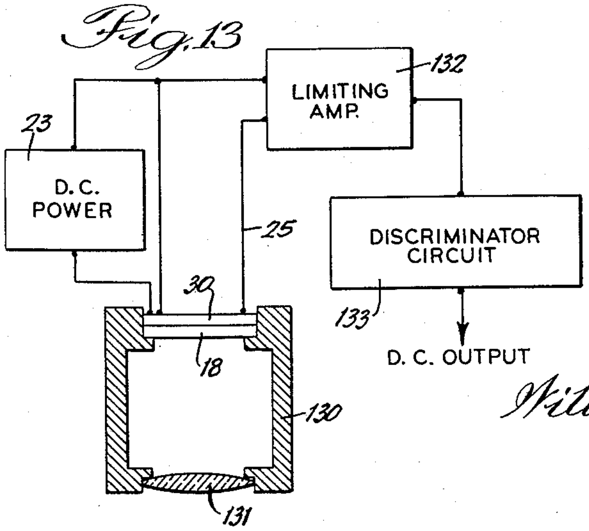

FIGURES 10, 11 and 12 illustrate an alternative construction of the embodiment of FIGURES 1, 2, and 3, with FIGURES 10 and 11 being divergent perspective exploded views of the assembly of FIGURE 12;

FIGURE 13 is a schematic diagram of one illustrative circuit employing the photocell of my invention is a scanner type of apparatus; and FIGURES 14A and 14B are graphs illustrative of the scanner signal output of the embodiment of FIGURES 1–3.

Referring now in detail to the drawings, and more specifically to FIGURES 1, 2, and 3, a support 30 is illustrated on which the several elements of my invention are arranged. On support 30 are positioned a series of electrically conductive bars 13 alternated in equi-spaced arrangement with a second series of like bars 14. Between each of the alternate bars 13 and 14 is centered another bar 15 of serpentine shape.

These several bars effectively divide support 30 into two series of strips, 20 and 22 respectively, for a purpose which will appear presently. In order to implement the functioning of strips 20 and 22, a collector 11 is provided to interconnect the bars 14; a collector 12 is provided to interconnect the bars 13; and a collector or terminal 16 is provided for bar 15. The bars 13, 14 and 15 and the collectors 11, 12 and 16 may be of any suitable electrically conductive material, such as gold, which may be applied by vacuum deposition through a mask, or plated and subsequently photo-etched.

On the support 30 and over the bars 13, 14, and 15 there is coated a layer of photo-conductive material 17, particularly shown in FIGURE 3. The photo-conductive material 17 may be any one of a variety of such materials, as for example, lead sulphide, lead selenide, germanium, or the like.

The photo-conductive material 17 is in turn covered with a protective cover 18. A number of substances are suitable for joining the support 30 and cover 18. Methacrylate adhesives have proved advantageous for edge joining of the support and cover. The joining substance must not poison the photo-conductive material and, in addition, should serve to seal the unit from any adverse effects of the surrounding atmosphere.

Since cover 18 is intended as a window for the radiation to be sensed, it must be transparent to this radiation. Since support 30 is intended to serve as a back support in this illustrative embodiment, it need not be transparent, and may, for example, take the form of a ceramic plate. However, support 30 is preferably rigid and electrically non-conductive. As will be apparent from the description which follows, support 30 may alternately be positioned as a front cover without any change in the arrangement of other elements. However, when support 30 is positioned as the front cover, it must be transparent to the radiation to be sensed in addition to its necessary rigidity and electrical conductivity.

An electrical conductor is attached to each of the three collectors 11, 12 and 16. Conductor 21 connects collector 11 to one terminal of a source of D.C. potential 23, for example, a battery. Conductor 24 connects collector 12 to the opposite pole of D.C. source 23. Conductor 25 connects collector 16 to any suitable indicating equipment. In such a configuration, an A.C. output signal proportional to the velocity of an image traversing the strips 20 and 22 will appear at the common lead, conductor 25.

For example, a light image first appearing on one of the strips 20 will reduce the impedance between bars 14 and 15, and the potential across conductors 21 and 25 will decrease in magnitude. As this image passes from one of the strips 20 to one of the adjacent strips 22, the impedance of the strips 20 will be restored whereas that of the strip 22 will be reduced. The potential across conductors 21 and 25 which had previously fallen, will then increase in magnitude. Thus, a voltage pulse will appear at the common lead, conductor 25, and because each series of strips is electrically interconnected through their respective collectors, the subsequent traverse of the image across the face of the invention will create a train of such pulses whose frequency is proportional to the velocity of travel. The frequency of this output pulse train is proportional only to the velocity component which is normal to the strips.

The general expression for output frequency is:

$$f=\frac{VN}{2}$$

where:

$f$ is the output frequency of the photocell;
V is the velocity of the image traversing the face of the photocell; and
N is the number of strips per unit length of the cell.

The output signal voltage of the cell for a uniformly moving light image should in theory be as graphically illustrated in FIGURE 14A. However, it may be found in some instances that an undesirable keystoning effect, as illustrated in FIGURE 14B, will be present in the output signal voltage. This effect may be caused by the resistance of the bar 15 and if it is found to be present, it can be overcome to give a signal closely approximating that illustrated in FIGURE 14A by providing several parallel leads or terminals in place of the single terminal 16.

From the foregoing, it can be appreciated by those skilled in the art that any desirable number of such strips may be employed, and for example, the strips may be as few as two in number. It has been found that a decrease in width of the strips, to increase the number of strips per unit length, increases the frequency of the output signal. Generally, such an increased output frequency has been found to be desirable. In addition, increasing the number of strips provides a more practical unit, particularly with respect to rejecting the effects of changing ambient radiation levels. In some models of the cell constructed in accordance with the embodiments of FIGURES 1 to 3, I have utilized twenty each of the strips 20 and 22, all 0.010±0.0005 inch wide. With strips of this width, the bars 13, 14 and 15 have been made substantially 0.001 inch wide. When such a configuration has been used with a lead sulphide photo-conductive layer 17 and a 1½ volt bias on the cell, dark noise has been measured on the order of 40 micro-volts, thereby permitting excellent signal to noise ratios.

From the foregoing, it is evident that light stimulated unbalances give rise to the signals developed by this photocell. It is further evident that the contrasting areas in an image traversing the face of the photocell can give rise to these signals. However, since the individual strips 20 are essentially equivalent to the strips 22 and since the strips 20 are interconnected as are the strips 22, the general level of light incident thereupon will effect the strips equally and no substantial unbalance will develop. In this manner, the effect of ambience in the incident light is cancelled or rejected. I have found that this rejection is facilitated by a large number of strips because of the average effects attained thereby.

Figure 4:
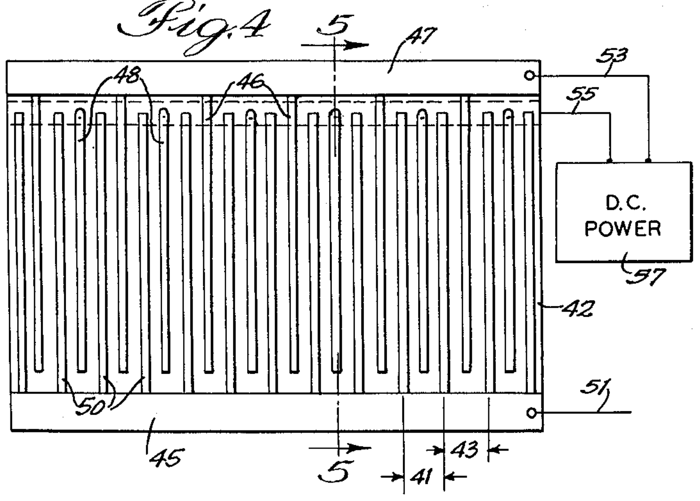
FIGURES 4 and 5 illustrate another embodiment of the invention with FIGURE 5 being taken substantially as shown along lines 5—5 of FIGURE 4.
Figure 5:
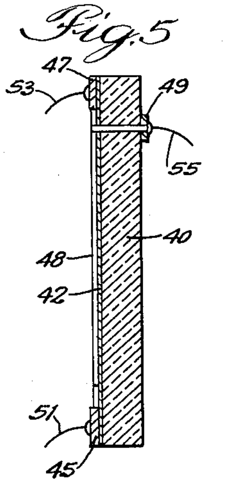

FIGURES 4 and 5 illustrate another embodiment of the invention wherein FIGURE 5 is a section taken substantially as shown along line 5—5 of FIGURE 4. In this embodiment, an insulating support 40 is front surface coated with a layer of photo-conductive material 42. A series of electrically conductive bars 46 is applied over the layer 42, and the electrically conductive bars 46, for example, may take the form of fine gold wires alternated in equispaced arrangement with a second series of like bars 48. Advantageously, another like bar 50 is centered between each of the alternate bars 46 and 48.

These several bars effectively divide layer 42 into two series of strips, such as strips 41 and 43, respectively, which function in a manner similar to the strips 20 and 22 of FIGURE 1. In order to implement this functioning a collector 45 is provided to interconnect the bars 50; a collector 47 is provided to interconnect the bars 46; and a collector 49 is provided to interconnect bars 48. To each of the collectors 45, 47 and 49 is affixed an electrical conductor shown as conductors 51, 53, and 55, respectively. Conductors 53 and 55 are connected to opposite poles of a source of D.C. potential 57 in order to facilitate development of the signal which appears at conductor 51. A protective shield of some transparent material (not shown) advantageously may be applied over the bars 46, 48 and 50 to aid in maintaining the functional characteristics of the cell.

It will be appreciated by those skilled in the art in light of the foregoing that many variations in the construction of this embodiment of the invention are possible. If support 40 is transparent to the radiation to be sensed, this surface may be exposed for viewing. Also, the various bars and collectors may be applied to support 40 either before or after coating of the support with the radiation sensitive material 42.

Still another embodiment of this invention is illustrated in FIGURES 6 and 7 wherein FIGURE 7 is a section taken substantially as shown along line 7—7 of FIGURE 6 and with the cross-section dimensions exaggerated for a better understanding. A series of photo-conductive strips 60 are affixed to the front surface of a rigid insulating support 62. In this particular illustrative embodiment, the strips 60 are of uniform width and are spaced apart by a distance substantially equal to their width. While the width and quantity of strips may vary over wide limits, in one particular application it has been found advantageous to utilize 20 such strips, each 0.010±0.0005 inch wide.

As in previously described embodiments, the radiation sensitive material in strips 60 may be compounded from any one of a number of materials, e.g., lead sulphide, lead selenide, and germanium being some of those found suitable. Affixing of the strips 60 to support 62 may be achieved in a preferred method by suitably masking support 62 and subsequently coating it with the radiation-sensitive material. An alternative method comprises the steps of coating of the entire front surface of support 62 with the radiation-sensitive material and subsequently removing those portions of the material located between the strips as by scribing. Other methods of the obtaining strips 60 may be equally as well employed within the principles of this invention.

As shown in FIGURES 6 and 7, a collector 64 of a suitable, electrically conductive material, such as gold, is arranged transverse to the adjacent terminations of the strips 60. A second collector 66 of similar nature is arranged transverse to the opposite terminations of strips 60. These collectors make electrical connections between the several strips 60 for reasons which are brought out hereinbelow.

Advantageously, a second series of thin, photoconductive strips 61 are affixed to the back surface of a second support 63. Preferably, strips 61 are substantially equivalent to strips 60 and are provided in a like manner. A pair of collectors 65 and 67, not shown, similarly are provided transverse to the terminations of strips 61.

Since support 63 is intended to serve as a front support it must permit passage of the radiations whose character it is desired to sense and measure. Therefore, support 63 preferably may take the form of a flat plate of electrical insulating material which is transparent to the radiation to be sensed.

After strips 60 and 61 have been affixed respectively to support 62 and to support 63, as described above, the two supports are joined together with a separation therebetween provided by a very thin sheet of a transparent dielectric material. Where the radiation to be passed by sheet 68 is in the visible spectrum, for example, I have found a 1/8 mil polyester film, such as is known under the registered trademark "Mylar," to be very satisfactory although other sheet materials may be employed with desirable results.

The two supports are joined together staggering the strips 60 and the strips 61 so that they are alternately exposed to an image traversing the face of support 63. Furthermore, the two supports are joined with strips 60 juxtaposed with strips 61. Thus, it will be appreciated that with strips 60 separated from strips 61 only by the sheet 68, the intensity of radiation incident on strips 60 is substantially equal to that incident on strips 61. Such an arrangement of supports 62 and 63 is illustrated in FIGURE 7.

As shown in FIGURES 6 and 7, an electrical conductor is attached to each of the four collectors 64, 66, 65 and 67. Conductor 70 connects collector 64 to one pole of a source of D.C. potential 71, for example, a battery; conductor 72 connects collector 65 to the opposite pole of D.C. source 71; conductor 73 interconnects collectors 66 and 67. Thus, the two sets of photo-conductive strips, strips 60 and 61, function in a manner similar to the strips 20 and 22 of FIGURE 1. In this illustrative embodiment of the invention, an A.C. output signal proportional to the velocity of an image traversing the strips 60 and 61 will appear at the common lead, conductor 73. Further, the affects of changing ambient radiation levels also is cancelled in a manner similar to that described with respect to the embodiment of FIGURE 1 since the changing ambient levels will fall on both series of strips equally and no substantial unbalance will develop. As in all other embodiments, this rejection is facilitated by a large number of strips because of the averaging effects involved.

Yet another embodiment of the invention is illustrated in FIGURES 8 and 9 wherein FIGURE 9 is a section taken substantially as shown along line 9—9 of FIGURE 8. Here a single support 80 has affixed to its front surface, in alternate fashion the photo-conductive strips 82 and photo-conductive strips 84. At one edge of support 80, an electrically conductive collector 85 forms a common interconnection between all of the photo-conductive strips. Elsewhere the individual strips are insulated from each other by narrow grooves 86. Advantageously, the width of the grooves 86 may be on the order of 1/10 the width of the individual strips. In this regard, it has been found that the strip spacing preferably is achieved by masking of the support during deposition of the photo-conductive material thereon.

A second collector 87 makes connection between those terminations of strips 84 which are opposite the collector 85. In like manner, a third collector 89 provides interconnection between the terminations of strips 82 which also are opposite collector 85. Collector 89 may conveniently be affixed to the back surface of support 80 with electrically conductive posts 88 extending through support 80 to make contact with each of the strips 82. An alternative method of providing collector 89 resides in a sequence of coatings which are alternately conducting and insulating.

To each of the collectors 85 and 87, and 89 is affixed an electrical conductor, such as conductors 90, 92, and 94, respectively. Conductors 92 and 94 are connected to opposite poles of a source of D.C. potential 96 in order to facilitate development of the signal which appears at conductor 90. Thus, strips 82 and 84 are connected in series opposition to produce a result identical to strips 60 and 61 of FIGURE 6 and analogous to the result produced by strips 20 and 22 of FIGURE 1. A protective shield of a transparent material may advantageously be applied over strips 82 and 84 to maintain their functional characteristics.

In accordance with the principles of this invention, each of the several photocell embodiments of FIGURES 1 to 9 is amenable to manufacture by methods other than those illustratively described hereinabove. One such manufacturing variation which advantageously utilizes a sandwich technique which is particularly suitable where it is desired to increase the scanner output frequency of the embodiment of FIGURES 1, 2, and 3 is shown in FIGURES 10, 11 and 12. By means of this sandwich technique, it is possible to manufacture cells whose output frequency is from 1½ to 2 times higher than that generally attainable from some cells constructed in accordance with the embodiment of FIGURE 1.

In the embodiment of FIGURES 10, 11, and 12, a number of similar thin electrically insulating sheets 101, 102, 103, and 104 are employed. On each of the sheets 101 through 104, two electrically conducting bars are applied on opposite sides of the sheet, as by vacuum deposition through a mask. Terminals may be formed simultaneously with the bars. On insulating sheet 101, the two conducting bars have been designated 105 and 106 and their terminals 107 and 108, respectively. On sheet 102, conducting bars 109 and 110 have terminations 111 and 112 applied thereon. Similarly, sheets 103 and 104 have applied thereon bars 113—114 and 117—118 which in turn, have terminations 115—116 and 119—120, respectively. In this illustrative embodiment, the bars with their respective terminations that face each other are made mirror images of each other, although variations omitting the alternate terminations also are practicable.

Following the applications of the various bars and terminals to the sheets 101, 102, 103, and 104, the sheets are grouped as illustrated in FIGURE 12. After being arranged in the pattern of FIGURE 12, the sheets are clamped together and bonded into a unitary structure by suitable means. While edge bonding of the sheets is feasible, one preferred method of attaining the unitized structure is to mold the lower extremities of the clamped sheets into a suitable thermoplastic support.

After bonding of the sheets into the unitized construction of FIGURE 12, a layer of suitable photo-conductive material 121 is coated onto the top surface of the sheets and into intimate contact with the conducting bars. After such coating, lead wires are connected to the several terminations in the manner indicated in the drawing; lead 122 being connected to the positive terminals 108 and 111; lead 123 to common terminals 107, 112, 115, and 120; and lead 124 to the negative terminals 116 and 119. The assembly then is completed by providing the photo-conductive coating 121 with a suitable protective cover. It will be appreciated that since the four sheets 101, 102, 103 and 104 together are the equivalent of the two strips 20 and 22 of FIGURE 1, several multiples of four sheets may be utilized to improve cell performance with respect to the rejection of ambient radiation levels.

Since the invention is particularly useful in scanners, FIGURE 13 is provided to illustrate its embodiment in a scanner system. The embodiment of FIGURE 1 is shown assembled in an opaque housing 130 with lens 131 directing the image to the photo-conductive coating 17 sandwiched between support 30 and cover 18. The output signal of the photocell is applied through conductor 25, as described hereinabove, to limiting amplifier 132 whose subsequent output is restricted to a selected range of the input frequency.

The output of limiting amplifier 132 is fed to discriminator circuit 133 which converts the pulses at its input to a D.C. output whose amplitude is proportional to the frequency of the input pulses. Since limiting amplifier 132 and discriminator circuit 133 are of types well known to those versed in the electronic arts and since the details of these elements comprise no part of the present invention, they are not illustrated in detail. Thus, when the invention is arranged according to the illustrative showing of FIGURE 13, it may be made to yield highly useful information, as for example, a measure of the angular velocity of an aircraft flying over ground surfaces whose image impinges upon the transported photocell of the invention.

Because photo-conductive materials have been found to be readily employable in the manufacture of the radiation sensor of the invention, the foregoing illustrative embodiments have been described as incorporating such materials. However, persons skilled in the art will perceive that the invention may employ other types of materials, such as photo-voltaic, photo-emissive, thermistor, or like materials.

The cell embodiments of FIGURES 1, 4, and 12 are relatively low impedance cells with an impedance on the order of 1000 ohms and as such are particularly useful in transistor circuit applications. On the other hand, the cell embodiments of FIGURES 6 and 8 are amenable to manufacture as high impedance cells with impedances on the order of one megohm, thus requiring a minimum of bias power. The high impedance cells are particularly useful in vacuum tube circuit applications.

While particular illustrative embodiments of the invention have been shown, it will be understood, of course, that the invention is not limited thereto since many modifications may be made to utilize the principles thereof. Accordingly, it is contemplated to cover by the appended claims any such modifications as fall within the true spirit and scope of the invention.

What is claimed as the invention is:

1. As an article of manufacture, a radiation sensitive cell comprising the combination of first and second electrically insulating support means having a pair of facing sides disposed parallel to each other, radiation sensitive strips disposed on each of said facing sides of said first and said second support means said strips being of substantially equal width and spaced apart by a distance equal to their width, the strips on said first support means being disposed opposite the spaces separating the strips on said second support means, a plurality of electrically conductive collector means disposed on each of said first and second support means and transverse to said strips, each of said collector means serving to electrically interconnect the strips on one of said support means, and radiation transparent electrically insulating means interposed between the said strips and said collector means on said first support means and the said strips and said collector means on said second support means.

2. As an article of manufacture, a radiation sensitive cell comprising the combination of electrically insulating support means, a first plurality of spaced apart electrically conductive bars disposed on said support means in parallel relation to each other, a second plurality of spaced apart electrically conductive bars disposed on said support means in parallel relation to each other, said second plurality of bars being interposed between said first plurality of bars, first collector means disposed on said support means electrically interconnecting said first plurality of bars, second collector means disposed on said support means electrically interconnecting said second plurality of bars, electrically conductive bar means disposed on said support means and interposed between said first and said second plurality of bars, terminal means disposed on said support means in electrical connection with said bar means, and a coating of radiation sensitive material on said support means disposed over said first and said second plurality of bars and said bar means.

3. The improvement of a radiation sensitive cell comprising the combination of electrically insulating support means, a coating of radiation sensitive material disposed on said support means, a first plurality of spaced apart electrically conductive bars disposed on said radiation sensitive material in parallel to each other, a second plurality of spaced apart electrically conductive bars disposed on said radiation sensitive material in parallel relation to each other and interposed between said first plurality of bars, first collector means disposed on said radiation sensitive coating electrically interconnecting said first plurality of bars, second collector means disposed on said radiation sensitive coating electrically interconnecting said second plurality of bars, serpentine shaped electrically conductive bar means disposed on said radiation sensitive material and interposed between said first and said second plurality of bars, terminal means disposed on said radiation sensitive material electrically connected to said serpentine shaped bar means, and a radiation transparent cover positioned over said bar means and said radiation sensitive material to protect said material from atmospheric deterioration.

4. The improvement of a radiation sensitive cell comprising, in combination, electrically insulating support means; a coating of radiation sensitive material disposed on said support means and forming a plurality of radiation sensitive strips thereon, said plurality of radiation sensitive strips being grouped into at least two pairs of radiation sensitive strips; and electrically conductive bar means disposed on said support means in electrical contact with said radiation sensitive strips, said electrically conductive bar means connecting the two strips comprising each pair of radiation sensitive strips in series, and connecting each pair of radiation sensitive strips in parallel with each of the other pairs of radiation sensitive strips, and connecting the junctures between the two strips comprising each pair of radiation sensitive strips.

5. The improvement of a radiation sensitive cell in accordance with claim 4 wherein said radiation sensitive material comprises lead sulphide.

6. The improvement of a radiation sensitive cell comprising, in combination, electrically insulating support means; a radiation sensitive coating disposed on said support means to form two groups of radiation sensitive strips; and electrically conductive bar means disposed on said support means in electrical contact with said radiation sensitive strips, said electrically conductive bar means connecting the strips comprising each group of radiation sensitive strips in parallel with each other, and connecting both of the said two groups of radiation sensitive strips in series.

7. As an article of manufacture, an improved radiation sensitive cell comprised of electrically insulating support means; a radiation sensitive coating disposed on said support means to form a first and second group of radiation sensitive strips, the individual strips of each group being spaced apart by a distance substantially equal to strip width, and the strips of said first group being interposed between the strips of said second group; and electrically conductive bar means disposed on said support means in electrical contact with said radiation sensitive strips, said electrically conductive bar means connecting in parallel each of the strips comprising said first group of radiation sensitive strips, and connecting in parallel each of the strips comprising said second group of radiation sensitive strips, and connecting said first and said second groups of radiation sensitive strips in series.

8. The improvement of a radiation sensitive cell comprising the combination of electrically insulating support means; a layer of radiation sensitive material disposed on said support means; and electrically conductive bar means in contacting relation with said layer and positioned to effectively divide said layer into at least two pairs of radiation sensitive strips adjacent one another, said bar means connecting in series the two radiation sensitive strips comprising each pair, and connecting each pair of radiation sensitive strips in parallel with each of the other pars of radiation sensitive strips, and connecting the junctures between the two strips comprising each pair.

9. As an article of manufacture, a radiation sensitive cell comprising the combination of electrically insulating support means; a radiation sensitive coating disposed on said support means; electrically conductive bar means positioned in contacting relation with said coating, said bar means being positioned to effectively divide said coating into a plurality of strips; and electrically conductive collector means connected to said bar means to further divide said plurality of strips into a first and a second group of strips with the strips of said first group being interlaced with the strips of said second group, and with each of the strips comprising said first group of strips connected in parallel with each other, and with each of the strips comprising said second group of strips connected in parallel with each other, and with said first and said second groups of strips connected in series.

10. A radiation sensitive cell in accordance with claim 9 wherein said radiation sensitive coating comprises lead sulphide.

11. An improved sensitive cell comprising the combination of a plurality of electrically insulating support means; a radiation sensitive coating disposed on a first one of said support means and forming a first group of radiation sensitive strips spaced apart by a distance substantially equal to strip width; a radiation sensitive coating disposed on a second one of said support means to form a second group of radiation sensitive strips spaced apart by a distance substantially equal to strip width, said strips of said second group having substantially the same width as the strips of said first group; electrically conductive bar means disposed on each of said support means in electrical contact with the strips thereon; radiation transparent electrical insulator means disposed between said plurality of electrically insulating support means; and joining means for said plurality of support means for maintaining the alignment of the strips of said first group with the spaces between the strips of said second group.

12. A radiation sensitive cell in accordance with claim 11 wherein said radiation transparent electrical insulator means comprises a thin sheet of flexible plastic material.

13. In a scanning system of the class wherein a scanning device moves with respect to a field of view to create a frequency representative of the velocity of the image of the field of view across the scanning device, the improvement of a scanning radiation sensitive cell comprising a coating of radiation sensitive material effectively divided into at least two pairs of strips; said divison of the radiation sensitive coating into said strips being effected by the contact with the coating material of a plurality of particularly positioned electrically conductive bars; said plurality of particularly positioned electrically conductive bars also connecting in series the two strips comprising each pair of strips, and connecting each pair of strips in parallel with each of the other pairs of strips, and connecting the junctures between the two strips comprising each pair of strips.

14. The improvement of a scanning radiation sensitive cell comprising the combination of a support member formed of electrically insulating material; a plurality of strips of radiation sensitive material positioned adjacent each other upon said support member; and electrical terminals electrically connected to said strips of radiation sensitive material for connecting adjacent ones of said strips in series and alternate one of said strips in parallel.

References Cited in the file of this patent

UNITED STATES PATENTS

| | | |
|---|---|---|
| 2,553,420 | McFee | May 15, 1951 |
| 2,776,357 | Porath | Jan. 1, 1957 |
| 2,805,347 | Haynes et al. | Sept. 3, 1957 |
| 2,813,983 | Hammar | Nov. 19, 1957 |
| 2,907,886 | Willard et al. | Oct. 6, 1959 |
| 2,930,999 | Van Santen et al. | Mar. 29, 1960 |